March 31, 1970        R. KOMPFNER        3,503,671

MULTIPLE-PASS LIGHT-DEFLECTING MODULATOR

Filed April 17, 1967        3 Sheets-Sheet 1

INVENTOR
R. KOMPFNER
BY
Wilford L. Wiener
ATTORNEY

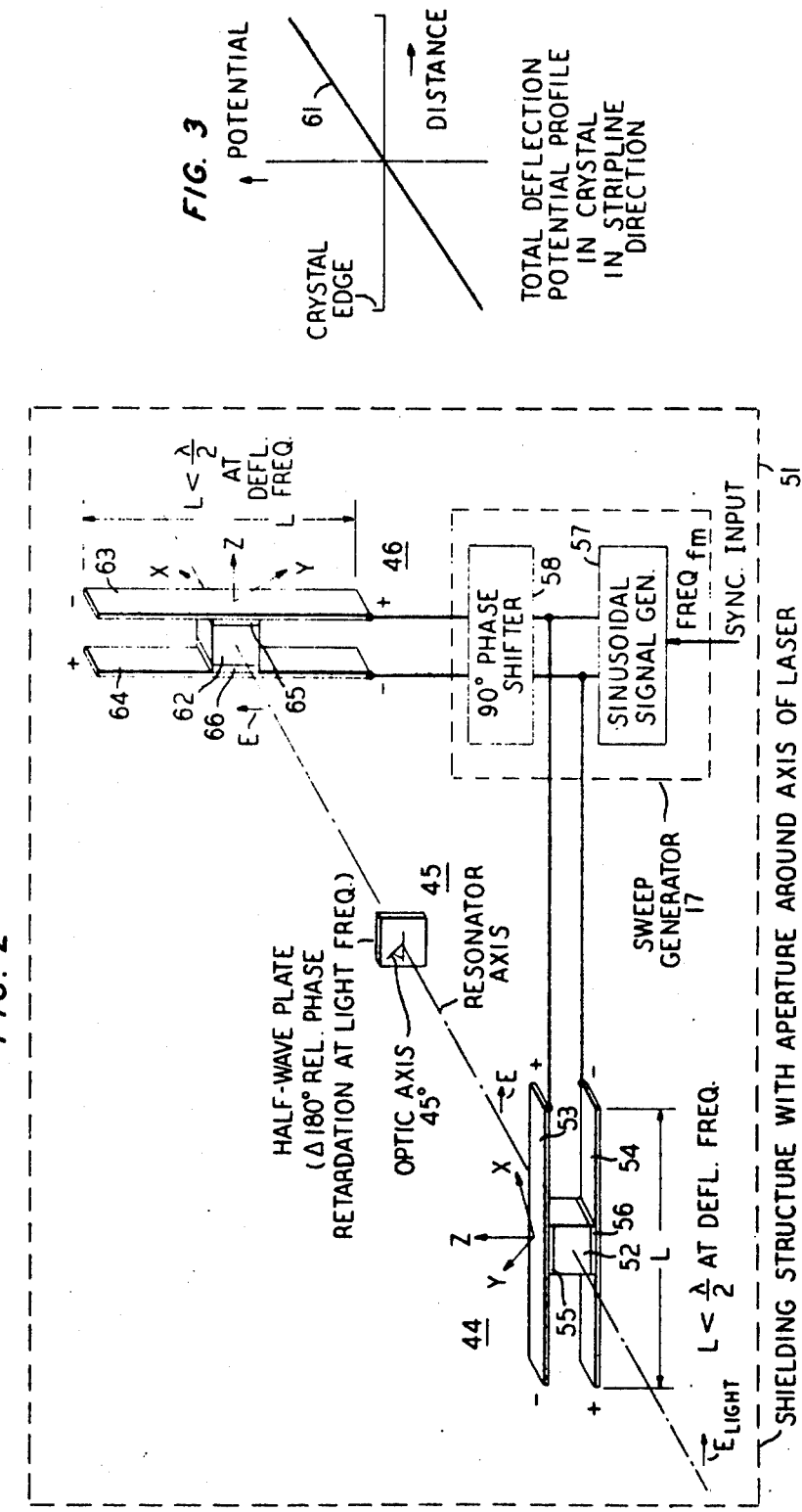

United States Patent Office 3,503,671
Patented Mar. 31, 1970

3,503,671
MULTIPLE-PASS LIGHT-DEFLECTING MODULATOR
Rudolf Kompfner, Middletown, N.J., assignor to Bell Telephone Laboratories, Incorporated, Murray Hill and Berkeley Heights, N.J., a corporation of New York
Filed Apr. 17, 1967, Ser. No. 631,394
Int. Cl. G02f 1/28; H01s 3/00
U.S. Cl. 350—160                                   6 Claims

ABSTRACT OF THE DISCLOSURE

High-speed deflection or modulation with substantial deflection angles of a coherent light beam is obtained by employing reflection and focusing arrangements providing multiple-pass operation in the deflector to multiply the deflection angles. In some embodiments, carrier-band modulation of the beam is provided as an inherent part of the deflection process. For example, one or more electro-optic crystals, each energized to have a variable index of refraction, are positioned at the common focal point of substantially confocally spaced reflectors. In this embodiment, the frequency of the variation is selected to increase the deflection once during every round trip between the deflectors. In still another embodiment, baseband modulation is provided either independently of the deflection or as an inherent part of the deflection. For example, a planar reflector, a corner reflector and lens therebetween with focal point on the planar reflector can provide deflection if the planar reflector is tilted with respect to the lens axis. Modulation such as baseband phase modulation is provided by an electro-optic element in the vicinity of the planar reflector and a baseband signal source. The multiple pass phase modulation of the beam is greater than the single pass modulation would be, yet remains proportionally responsive to the phase modulation signal. Nevertheless, a nontilted planar reflector could also be employed in combination with an electro-optic deflector to provide the baseband modulation as an inherent part of the deflection.

Cross-references to related applications

This application is filed concurrently with the joint application of S. J. Buchsbaum and myself and the sole application of E. A. Ohm, Ser. Nos. 631,301, and 631,505, respectively, both assigned to the assignee hereof.

Background of the invention

This invention relates to apparatus for deflecting and modulating light beams with a substantial range of deflection angles.

The evolving technology directed toward optical communication systems has shown that controllable deflection of light with a substantial range of deflection angles, greater than a range of the order of a few degrees, can typically only be obtained by mechanically driven or electro-mechanically driven deflectors. Yet these types of deflectors are too slow for use in the types of communication systems now typically envisioned.

For example, in my above-cited, concurrently filed application with S. J. Buchsbaum, the deflection repetition rate is the same as the optical multiplexing frequency. Full utilization of the information-carrying capacity of such a system depends upon the availability of multiplexing frequencies that are typically much higher than the maximum repetition rates of mechanical or electro-mechanical deflectors.

Any light deflector producing interactions of light with electric and magnetic fields, which could provide repetition rates in the range of interest, typically employs distributed parameter interactions which involve material properties that extend through dimensions that are large compared to a wavelength of light. My invention is directed primarily toward solving the problem of increasing the range of angles of deflection and the degree of modulation obtainable from light-deflecting modulators producing distributed-parameter interactions between a light beam and electromagnetic fields.

Summary of the invention

I have recognized that the solution to this problem is a multiplying light-deflecting modulator. According to my invention, such a modulator is a multiple-pass apparatus comprising a source of a beam of coherent light, a pair of opposed reflectors adapted to receive the beam to pass through the vicinity of a particular point therebetween, means for deflecting and modulating the light beam in that vicinity, and focusing means associated with the reflectors for returning the beam to that vicinity at least once during every two passes between the reflectors, the deflecting and modulating means including a source of a signal of frequency in a range to increase the modulation of the beam at least once during every round trip or two passes between the reflectors. In some embodiments, the modulation will be increased on each two passes between reflectors if the half-period of the driving signal equals the time elapsed during the two passes. In other embodiments, the modulation will be increased on each two passes between the reflectors if the frequency of the driving signal is between zero frequency and a frequency substantially equal to the frequency for which a half-period is the time in which the beam makes a plurality of passes between the reflectors from entry to exit from the deflector.

A basic principle involved in the operation of my light-deflecting modulators is that, since a substantially confocal arrangement of reflectors, or half-confocal arrangement, or the lens analog thereof can support a large number of modes as a resonator, a non-reentrant path of the light beam can be provided throughout a very large number of passes, as determined by the diameter, convergence and direction of the beam as it enters and by the size of the increment of deflection in the deflecting and modulating means.

Multiple-pass operation of the modulator results, whether the input light beam enters through a central aperture in one of the reflectors and eventually exits past the edge of either one of the reflectors, or whether its entrance and exit are interchanged. The interchangeability of entrance and exit, together with the preferred circular trace obtainable from it, make this modulator particularly advantageous for optical time division multiplex transmission systems of the type disclosed in my above-cited, concurrently filed patent application with S. J. Buchsbaum.

Brief description of the drawing

FIG. 2 is an exploded perspective view of the active components of the light deflector of FIG. 1;

FIG. 3 shows a typical deflection potential profile in the deflection coordinate for one of the electro-optic crystals of FIG. 2;

Detailed description of illustrative embodiments

Figure 1:
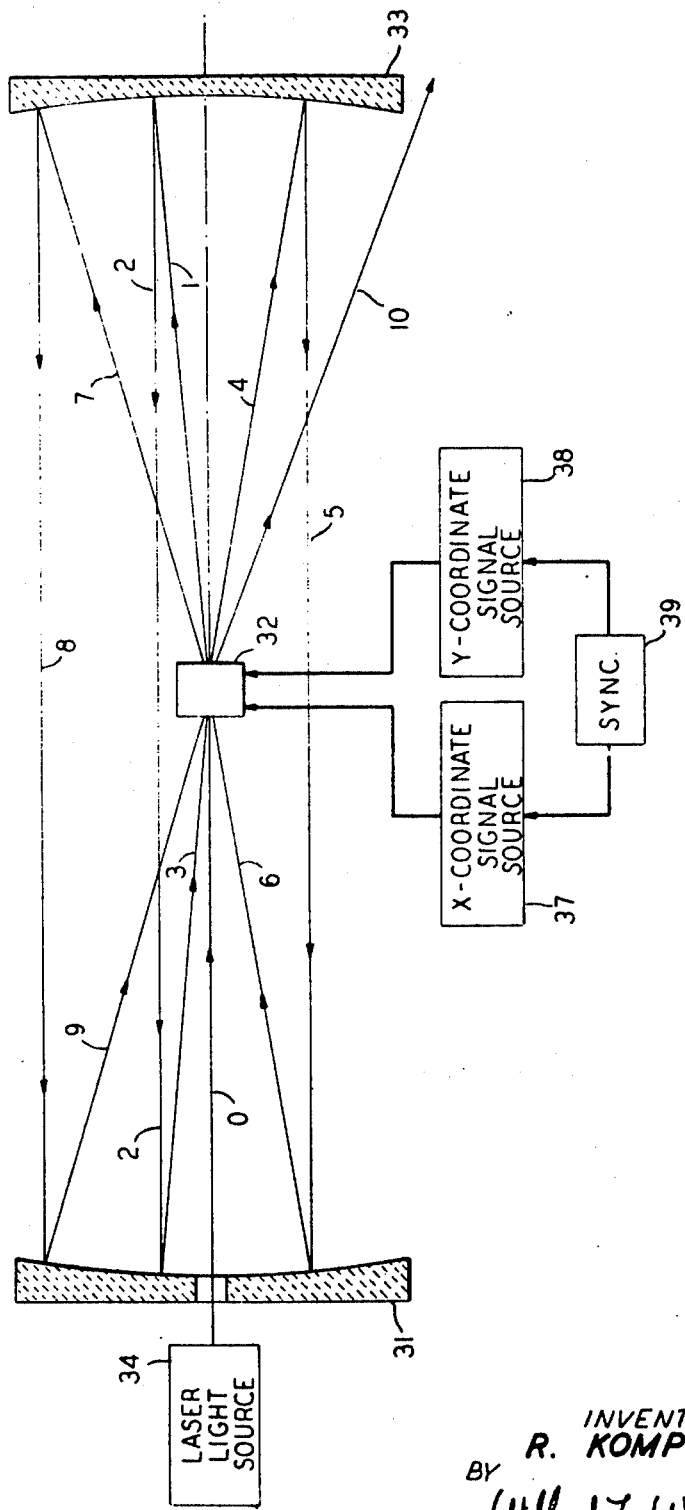
FIG. 1 is a partially pictorial and partially block diagrammatic illustration of a first embodiment of my invention.

In FIG. 1, it is assumed that a beam of light, preferably coherent light from a laser 34, approaches the illustrated deflection apparatus from the left, along the common axis of the focusing reflectors 31 and 33. It is desired to deflect this beam with a controllable conical scan to pass beyond the edges of reflector 33.

In implementing the basic idea of a conical scan of circular cross section, the deflector of FIG. 1 represents a solution to the problem that the deflection angles in most electro-optic deflection apparatus, such as the apparatus 32 are relatively small. Basically, multiplication of the small electro-optic deflections is obtained by bouncing the deflected beam a number of times off the confocally spaced mirrors 31 and 33, while varying the deflecting signals applied to apparatus 32 periodically at appropriate frequencies from the X-coordinate signal sound 37 and the Y-coordinate signal source 38. The deflection apparatus 32 illustratively includes two electro-optic crystals and appropriate means for coupling the crystals optically, as described hereinafter with reference to FIGS. 3 and 4. The laser 34 is a continuous-wave laser, such as a helium-neon, neodymium in yttrium aluminum garnet, xenon, or carbon dioxide laser.

The operation of the deflector of FIG. 1 can be described as follows. Assume that a coherent narrow light beam enters the deflector along path 0 through a central aperture or uncoated transmissive portion of the mirror 31. The deflection apparatus 42 is suitably energized with X- and Y-coordinate deflection signals, 90° out of phase and of equal amplitude. The beam as it strikes the reflector 33 would describe, for a single pass through apparatus 32, a circular cone of some small angle, $\theta$. It will be noted that the beam is obliquely incident at the reflector 33 along the path 1, so that the beam will propagate back past the apparatus 32 parallel to the common axis of the reflectors 31 and 33 along path 2. In order that the path 2 misses the apparatus 32, the active components thereof should have a lateral extent from the axis typically not greater than $\theta$ (in radians) times half the distance between reflectors 31 and 33, less half the width of the beam. This geometry is made desirable by the fact that the deflection apparatus 32 is located at the common focal point of the reflectors 31 and 33. The light beam now is reflected by the reflector 31 and returns to the deflection apparatus 32 along path 3.

The deflection will be augmented with every two passes through the rotary deflector 32 if the elapsed time, $4f/c$, for two passes between reflectors 31 and 33 equals half a period of the deflection signal frequency $f_m$, which is also the multiplexing frequency. When this relationship exists, the beam illustratively follows paths 4, 5, 6, 7, 8 and 9 successively and exits from the deflector along path 10. It should be noted that these paths do not lie in a common plane. In principle, high multiplication factors for the deflection can be achieved; the multiplication factor depends directly upon the number of passes that the light beam is constrained to make between reflectors 31 and 33 before it is emitted as an output. The multiplication factor can be raised by increasing the lateral extent of the reflectors 31 and 33.

The light-deflecting modulator of FIG. 1 is a multiple-pass apparatus instead of a resonant apparatus because the beam at no time repeats any part of its path between its entry into the structure and its departure therefrom as the deflected beam.

The confocal spacing of mirrors 31 and 33 means that the center of curvature of each lies at a central point upon or near the surface of the other one and that the common focal point lies at a point halfway therebetween. A half-confocal arrangement of reflectors would also permit similar increase of deflection with the deflecting and modulating means disposed at the planar reflector.

The deflector of FIG. 1 may also be modified as disclosed and specifically claimed in the above-cited, concurrently filed application of E. A. Ohm, which describes a different specific embodiment of the generic concept.

An advantage of the rotary deflector of FIG. 1 is that the curvature of the mirrors prevents spreading of the light beam due to diffraction, regardless of the positioning of the deflection apparatus.

The X-coordinate signal sources 37 and 47 in FIG. 1 are conventional sources of equal-amplitude sinusoidal signals of like frequency. In order to produce a circular trace in a plane normal to the axis of the deflector, the X-coordinate and Y-coordinate signals are synchronized to be 90° out of phase. The synchronization can be accomplished with a conventional synchronizing circuit 39.

A preferred construction of the apparatus 32 is shown in the exploded view of FIG. 2. It is assumed that the horizontal deflection stage 44 is farthest from the mirror 33 and the vertical deflection stage 46 is nearest to the mirror 33. Mirror 33 is not shown in FIG. 2 in order to simplify the drawing and the explanation.

The horizontal deflection stage 44 comprises the electro-optic crystal 52, illustratively a KDP (potassium dihydrogen phosphate) crystal having its Z-crystalline axis oriented orthogonal to the plane including the common axis and the desired deflection coordinate and having its X- and Y-crystalline axes both oriented at angles at 45° with respect to the common axis in the plane of the common axis and the desired deflection coordinate. Crystal 52 is energized by the X-coordinate deflection signal through the symmetrically disposed strip lines 53 and 54, each of which is slightly less than a half-wavelength long at the deflection frequency, $f_m$, and is oriented parallel to the direction of the desired deflection coordinate. Strip line 54 is separated from crystal 52 by the metal step 56 and the strip line 53 is separated from crystal 52 by the metal step 55. These metal steps help to shape the driving electric field distribution, which distribution will be described hereinafter. The symmetrical disposition of the strip lines 53 and 54 with respect to crystal 52 provides an effective ground plane halfway therebetween. This arrangement is a balanced arrangement. The application of power through the strip lines 53 and 54 to the crystal 52 is facilitated by the presence of the shielding structure 51 which encompasses both deflection stages except for the needed aperture for the deflected beam and except for the area of the reflector 42 immediately adjacent to the deflection stage 46.

Between deflection stage 44 and deflection stage 46 there is inserted a half-wave plate 45 which is illustratively a calcite crystal cut to have appropriate thickness at the desired modulating frequency and to have parallel major faces that are oriented orthogonally to the common axis of the deflector. These major faces are cut parallel to the optic axis of the crystal which is oriented at 45° with respect to both of the desired deflection coordinates as indicated. The crystal 45 produces 180° relative phase retardation between polarization components respectively parallel and perpendicular to the optic axis as they pass therethrough. The vertical deflection stage 46 comprises the crystal 62, the symmetrically disposed strip lines 63 and 64, each slightly less than a half-wavelength long, and metal steps 65 and 66, all of which are comparable to the elements of deflection stage 44 which are numbered with numbers ten digits lower. It was be seen that deflection stage 46 is effectively the same as deflection stage 44 rotated 90" in a plane orthogonal to the common axis.

In the operation of the deflection stages of FIG. 2, the X-coordinate deflection signal is applied to the strip lines 53 and 54 so that the former has a positive-to-negative voltage gradient in one direction when the other has a negative-to-positive voltage gradient in the same direction. Both gradients having the same potential at a point midway between the ends, directly above and below the center of crystal 52, respectively. These voltage gradients are sustained on the strip lines 53 and 54 because they are nearly a half-wavelength long at the modulating frequency $f_m$, and behave as transmission lines at that frequency. Their length is somewhat less than a half-wavelength because of the dielectric effect of crystal 52. Within the crystal 52, the effects of the voltage gradients produced by strip lines 53 and 54 are additive so that the total voltage difference, or deflecting potential, across crystal 52 at any X-coordinate point therein is twice as great as would be produced by one of the strip lines alone. The voltage differences across crystal 52 vary from left to right in a linear manner as shown in FIG. 3, in which the negative portion of curve 61 represents a voltage which is negative at strip line 53 and positive at strip line 54 and the positive position represents a voltage which is positive at strip line 53 and negative at strip line 54.

It should be understood that this voltage profile for crystal 52 varies its slope continuously with time between that shown and an equal negative slope at the deflecting frequency $f_m$.

The light input to deflection stage 44 is assumed to be polarized in the X direction in order to obtain the maximum response to the voltage profile. The voltage profile produces a deflection effect exactly analogous to a left-to-right density profile shaped as shown by curve 61 of FIG. 3. In more theoretical terms, the voltage profile produces a corresponding profile in the index of refraction.

The half-wave plate 45 converts the polarization of the light from an X-axis polarization to a Y-axis polarization in order to make it as responsive as possible to the index-of-refraction profile that is obtained in vertical deflection stage 46 in a manner similar to that of the horizontal deflection stage 44. The light beam will be bent toward the region of the highest index of refraction of crystal 52, illustratively to the right in the drawing, and will be bent toward the region of highest index of refraction in crystal 62, illustratively in the downward direction. After a slightly oblique reflection from the mirror 43, the beam will experience additional deflections in the same directions upon its reverse passage through crystals 62 and 52. During the reverse passage, the halfwave plate 45 converts the vertical polarized light emerging from crystal 62 into horizontal polarized light entering crystal 52.

My invention also encompasses baseband light-deflecting modulators.

Figure 4:
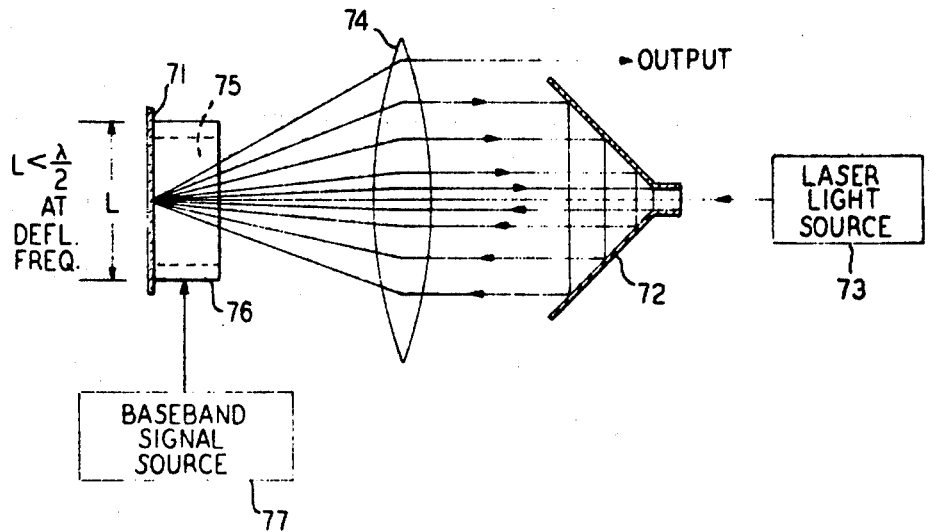
FIG. 4 is a partially pictorial and partially block diagrammatic illustration of a second embodiment of my invention.

In FIG. 4 the pair of reflectors comprise the substantially planar reflector 71 and the corner reflector 72 which is shown in somewhat distorted form in order to simplify the explanation of the principles of operation. The corner reflector 72 has an aperture at its vertex through which is admitted a coherent beam of light from the laser light source 73, illustratively one of the types described above for the embodiment of FIG. 1. A lens 74 is disposed between the reflectors 71 and 72 with a focal point at the surface of the planar reflector 71. The lens 74 renders the combination of reflectors 71 and 72 with it to be the lens analog of a confocally spaced focusing reflector combination.

In order to provide deflection of the coherent light beam in the vicinity of the surface of planar mirror 71, an electro-optic crystal 75 is illustratively disposed on reflector 71 and centered upon the focal point of the lens 74. Two strip line electrodes 76 are attached to lateral surfaces of the crystal 75. These electrodes are each slightly less than a half-wavelength long and are energized from the baseband signal source 77.

In the operation of the embodiment of FIG. 4, the combination of electro-optic crystal 75 and strip line electrodes 76 is fabricated and used as explained above for a deflecting stage of FIG. 2. Indeed, a combination of two deflection stages operating in orthogonal coordinates and employing a half-wave plate therebetween could be substituted for the combination of crystal 75 and electrodes 76. Single-coordinate deflection is explained here for purposes of simplicity, although two-coordinate deflection would be used if a conical or circular scan of the output light beam is desired.

On its first pass between the reflectors 72 and 71, the coherent light beam from source 73 passes through the aperture of reflector 72 and then through the center of lens 74 to enter crystal 75 in alignment with the focal point of lens 74. The driving signal from source 77 produces a bending of the light beam as explained above in connection with FIGS. 2 and 3 so that, illustratively, the reflected beam travels back toward lens 74 at a small angle above the horizontal. It is directed parallel to the axis of the apparatus by the lens 74 and is retro-reflected by corner reflector 72; that is, it is reflected in a direction also parallel to the axis of the apparatus but offset below the axis by as much as it struck reflector 72 above the axis. Lens 74 then redirects the returning beam substantially toward its focus at the back side of crystal 75. Upon the succeeding two passes through crystal 75, the deflection is increased still further according to the principles explained above in connection with FIGS. 2 and 3. This multiplication of the deflection continues until the offset of the beam from the axis is greater than the lateral extent of the reflector 72 in the direction of the deflection. The beam then exists from the apparatus as an output. The output beam is a modulated beam, as well as a deflected beam in the sense that the frequency at which, and the time for which, it appears as an output, is under control of the baseband signal source 77.

With respect to the operation of corner reflector 72, it should be observed that the conventional corner reflector has three mutually perpendicular interiorly reflective surfaces, as in the corner of a cube. Even in a single-coordinate deflector, all three reflective surfaces will generally be involved in the retro-reflection, although this is not easily illustrated in the drawing of FIG. 4. The preferred form of reflector 72, at least for simple applications, is one which provides a substantially circular projection of its lateral edges upon a plane orthogonal to the axis. It should be clear that the multiplication of deflection obtained, for a given signal, can be increased by simply increasing the lateral extent or dimensions of the deflective surfaces of corner reflector 72.

Figure 5:
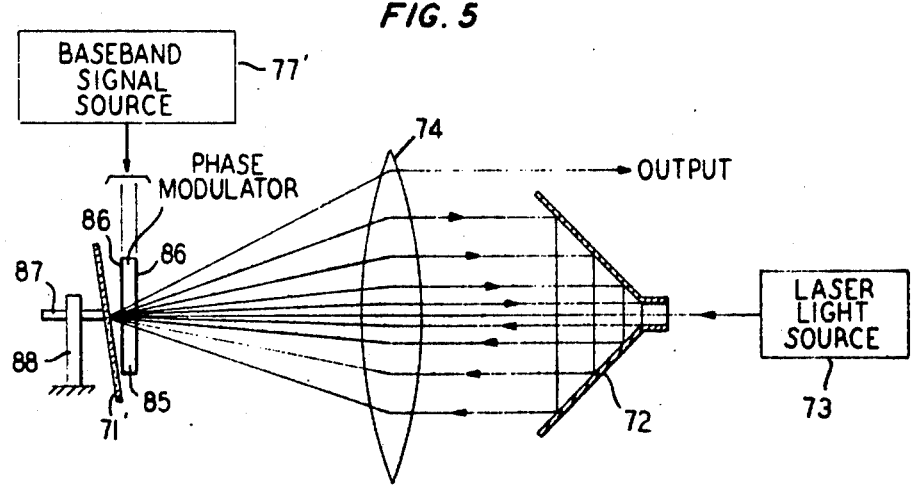
FIG. 5 is a partially pictorial and partially block diagrammatic illustration of a third embodiment of my invention.

A number of other retro-reflective devices might also be substituted for the corner reflector 72. For example, in the copending application of A. G. Fox (Case 57), Ser. No. 623,067, filed Mar. 14, 1967, and assigned to the assignee hereof, it explained how certain combinations of a lens and a backing reflector can provide the desired property of retro-reflectivity, including lateral offset of the beam. In the embodiment of FIG. 5, one such lens and backing reflector would be sufficient.

The most outstanding property of the embodiment of FIG. 4 is its ability to respond to a baseband signal, that is, a signal ranging all the way from zero frequency to the frequency for which the half-period is equal to the time required for the light beam to make its multiple passes between reflectors 71 and 72 from entry to exit. This baseband operation should be contrasted to the carrier-band operation provided by the embodiment of FIG. 1. In other words, in the embodiment of FIG. 1, the signal had to be in a range about a frequency for which the half-period was only the time required for the beam to make two passes between the reflectors. That operation is, broadly, a bandpass operation; and, since the center of the frequency range used corresponds to a carrier frequency for most types of intelligence that might be transmitted, the operation of the embodiment of FIG. 1 can be characterized as carrier-band modulation. In contrast, the operation of the embodiments of FIGS. 4 and 5 is baseband operation, since it extends to zero frequency. One principal difference between the bandpass or carrier-band deflectors and the baseband deflectors is that the active elements of the former deflect the beam in opposite directions alternately, within each coordinate, whereas the active elements of the latter always deflect the beam in the same sense in each coordinate.

One distinct advantage of the baseband operation is that the multiplication of deflection can readily be made separate from the multiplication of the modulation effect. This principle is illustrated in the embodiment of FIG. 5.

In the embodiment of FIG. 5, the planar reflector 71' is tilted at a small angle with respect to a position normal to the axis of the apparatus by means of an oblique mounting on a shaft 87 which turns in mirror mount 88. It will be seen that the axis of the deflector is still defined by the aperture of corner reflector 72 and the axis or corresponding focal point of lens 74. The tilt of reflector 71' will provide an increase in the angle of deflection of the beam during every two passes, that is, twice the angle of tilt, as a result of the well-known principles of reflection. The entering coherent light beam from laser source 73 is deflected in the first instance because it is incident at reflector 71' at the tilt angle with respect to the normal to reflector 71'. The accumulation of the deflection during the multiple passes between entrance and exit is substantially the same as for the embodiment of FIG. 4 except that it is not under control of the same signal as is modulator 85. The term "deflection" as used in the preceding description is generic to a controllable scanning of the beam in the sense that the angle of tilt of reflector 71' can be varied, for example, rotated.

To provide modulation in addition to the accumulating deflection, a baseband phase modulator is provided by disposing an electro-optic crystal 85 in the vicinity of reflector 71' with its optic axis aligned with the axis of the apparatus. The crystal 85 is energized through transparent electrodes 86 in any of the known conventional ways to produce electro-optic phase modulation. The electrodes 86 are energized from a baseband signal source 77'. In order to avoid undue reflection losses in the wedge-shaped space between the phase modulator and the tilted reflector 71', an optical matching material (not shown) of conventional type may be introduced into that space.

In operation, as deflection of the laser beam accumulates in the embodiment of FIG. 5, the degree of phase modulation will also increase, although proportional at all times to the signal from the modulation source 77'. Thus, the modulation is not an inherent part of the deflection as in the preceding embodiments. Similarly, other types of multiplied or strengthened modulation could be obtained by modifying the embodiment of FIG. 5 to provide, for example, amplitude modulation such as might be produced by a variable absorption, frequency modulation such as might be produced in a parametric device, or other forms of optical modulation.

In all such cases, the degree of modulation will be dependent on the total number of passes made by the light beam between the pair of reflectors.

In any of the illustrative embodiments, magnetooptic effects or other electro-optic effects might be employed instead of the electro-optic effects described. Typically, such other effects are distributed-parameter effects.

What is claimed is:
1. A light-deflecting modulator comprising a source of a beam of coherent light,
   a pair of opposed reflectors adapted to receive said beam for passage through the vicinity of a particular point therebetween,
   one of said reflectors having at least two mutually orthogonal faces and a central aperture, said one reflector being disposed with said aperture between said source and said point,
   means for deflecting and modulating said light beam in said vicinity, and
   focusing means associated with said reflectors for returning said beam to said vicinity at least once during every two passes between said reflectors,
   said deflecting and modulating means including
      a source of a signal of baseband frequency effective to increase the modulation of said beam during each pass through said deflecting and modulating means.

2. A light-deflecting modulator according to claim 1 in which
   the other of said reflectors comprises a substantially planar reflector,
   the focusing means comprises a lens disposed between said reflectors with a focal point at said planar reflector,
   the deflecting and modulating means being disposed in the vicinity of said focal point.

3. A light-deflecting modulator according to claim 2 in which the deflecting and modulating means includes in the vicinity of said focal point a deflecting element and a separate modulating element coupled to and responsive to the signal source.

4. A light-deflecting modulator comprising
   a substantially planar reflector,
   a corner reflector having a central aperture,
   a source of a beam of polarized coherent light directed to a particular point between said reflectors in the vicinity of said planar reflector,
   a lens disposed between said reflectors with a focal point at said particular point,
   means for deflecting and modulating said beam in the vicinity of said particular point to provide $2n$ passes of said beam before exiting from between said reflectors, $n$ being determined in part by the lateral extent of said corner reflector, said deflecting means including
      an active element disposed to transmit said beam and adapted to affect an optical property of said beam, and
      a source which has a variable signal output of a frequency between zero frequency and a frequency substantially equal to a frequency for which a half-period is equal to the time in which said beam makes it $2n$ passes from entry to exit, said source being coupled to said active element.

5. A light-deflecting modulator according to claim 4 in which
   the means for deflecting and modulating said beam includes a mutual adaption of the active element and signal source to provide a varying index of refraction in said active element.

6. A light-deflecting modulator according to claim 4 in which
   the means for deflecting and modulating said beam includes
   means for tilting said planar reflector,
   said active element and the signal source being mutually adapted to provide modulation of said beam that is independent of the deflection of said beam.

References Cited

UNITED STATES PATENTS 3,395,365    7/1968    Fork _____ 331—94.5
3,395,960    8/1968    Chang et al. _____ 331—94.5 X RONALD L. WIBERT, Primary Examiner PAUL K. GODWIN, JR., Assistant Examiner U.S. Cl. X.R.
331—94.5; 332—7.5